United States Patent [19]

Takeda et al.

[11] Patent Number: 5,058,554
[45] Date of Patent: Oct. 22, 1991

[54] FUEL INJECTION SYSTEM FOR ENGINE

[75] Inventors: Masahiro Takeda; Hideo Shiraishi, both of Hiroshima, Japan

[73] Assignee: Mazda Motor Corporation, Hiroshima, Japan

[21] Appl. No.: 427,646

[22] Filed: Oct. 27, 1989

[30] Foreign Application Priority Data

Oct. 31, 1988 [JP] Japan ................. 63-277032

[51] Int. Cl.⁵ ............................................ F02M 41/00
[52] U.S. Cl. .................................... 123/456; 123/468; 123/470; 239/600
[58] Field of Search ............... 123/456, 468, 469, 469, 123/470, 472; 239/600, 585

[56] References Cited

U.S. PATENT DOCUMENTS

| | | | |
|---|---|---|---|
| 3,930,483 | 1/1976 | Blisko | 123/468 |
| 4,768,487 | 9/1988 | Yamamoto | 123/468 |
| 4,805,575 | 2/1989 | de Concini | 123/456 |
| 4,844,036 | 7/1989 | Bassler | 123/456 |
| 4,895,124 | 1/1990 | Bartholomew | 123/468 |
| 4,913,119 | 4/1990 | Usui | 123/468 |
| 4,950,171 | 8/1990 | Muzslay | 123/456 |

FOREIGN PATENT DOCUMENTS 62-29469 2/1987 Japan .
62-193177 12/1987 Japan .

*Primary Examiner*—Carl Stuart Miller
*Attorney, Agent, or Firm*—Sixbey, Friedman, Leedom & Ferguson

[57] ABSTRACT

A fuel injection system for an engine has a plurality of bottom-feed type fuel injection valve assemblies. Each of the assemblies has an outer casing and an injector main body which is accommodated in the outer casing and is electrically operated. The outer casing is provided with a fuel inlet and a fuel outlet in communication with each other. A fuel supply pipe is connected to the fuel inlet of the upstreammost fuel injection valve assembly, and a fuel return pipe is connected to the fuel outlet of the downstreammost fuel injection valve assembly. A connection pipe connects the fuel outlet of each fuel injection valve assembly to the fuel inlet of the next fuel injection valve assembly. A wire harness for supplying power to the injector main body extends through a harness member which has a plurality of valve holders formed integrally therewith. Each valve holder is fixed to the upper portion of the outer casing by a fastener.

10 Claims, 5 Drawing Sheets

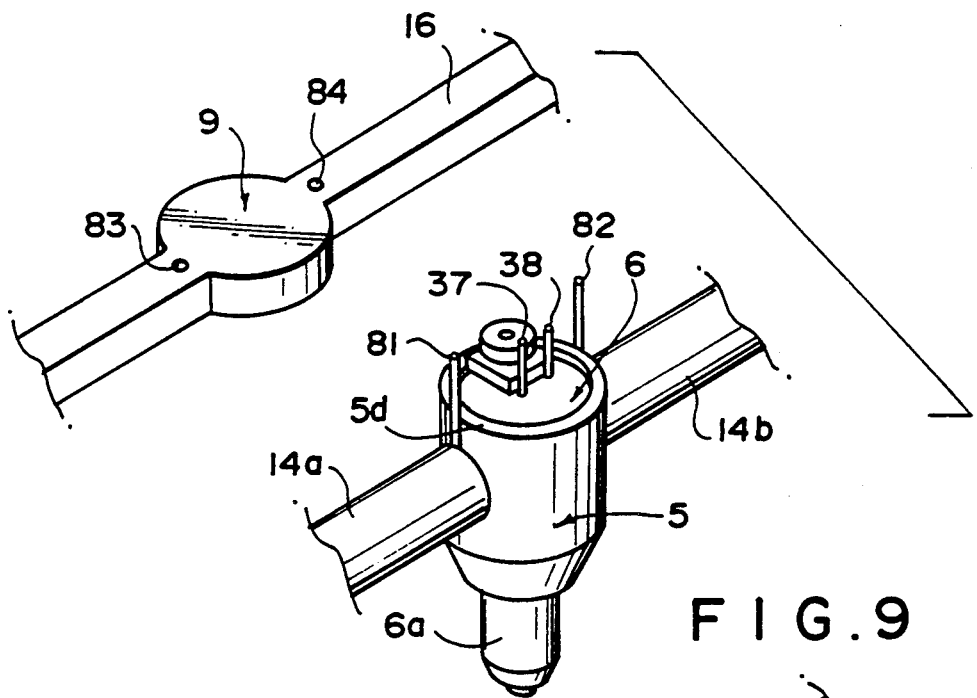
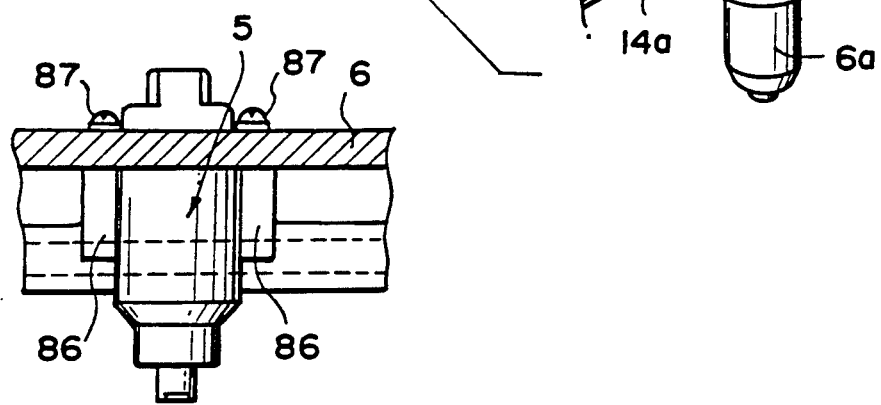

FUEL INJECTION SYSTEM FOR ENGINE

BACKGROUND OF THE INVENTION

1. Field of the Invention

This invention relates to a fuel injection system for an engine.

2. Description of the Prior Art

Recently electronic-control fuel injection systems have been in wide use in various vehicle engines. In such electronic-control fuel injection systems, so-called top-feed type fuel injection valves have been commonly used.

The top-feed type fuel injection valve is a solenoid-operated fuel injection valve and has a tubular valve body. In the top-feed type fuel injection valve, fuel is fed to the valve body through a feed port formed near the top end thereof and injected through an injection port formed on the bottom of the valve body. The top-feed type fuel injection valve having such a structure is advantageous in that since the fuel simply flows in the tubular body in the axial direction thereof, the injection valve may be simple in structure.

On the other hand, the top-feed type fuel injection valve is disadvantageous in the following point. That is, in the top-feed type fuel injection valve, the fuel return passage is provided upstream of the feed port, and accordingly, a certain amount of fuel dwells in the valve body. When the fuel dwelling in the valve body is evaporated by heat transmitted from the engine body or by radiation heat therefrom, vapor lock can occur.

Further, in some recent engines, the intake passage is long in order to increase the engine output by kinetic effect of intake air, and at the same time, a surge tank is disposed above the intake manifold and a cover is provided over the surge tank in order to compactly arrange the engine. In such engines, the fuel injection valves are more apt to be heated and the aforesaid problem is more serious.

In order to solve the problem, there has been proposed a bottom-feed type fuel injection valve as disclosed, for instance, in Japanese Unexamined Utility Model Publication Nos. 62(1987)-29469 and 62(1987)-193177. In the bottom-feed type fuel injection valve, fuel is fed to the valve through a feed port formed in a lower portion of the valve body and the residual fuel is returned to the fuel piping (generally the fuel feed piping for the next cylinder) through a fuel discharge port formed in the valve body at the substantially same level as the fuel feed port. Generally the bottom-feed type fuel injection valve comprises an outer casing, and an injector main body (formed of a solenoid coil and an on-off valve) which is housed in the outer casing, and the feed port and the fuel discharge port are formed in the lower portion of the outer casing. The solenoid coil is connected to a connector which is provided in a wire harness one for each cylinder.

However, various difficulties are encountered in actually incorporating the bottom-feed type fuel injection valves in the intake system of the engine and connecting them to the fuel piping and the power supply harness members. That is, unlike the top-feed type fuel injection valve, in the case of the bottom-feed type fuel injection valve, both the fuel feed port and the fuel discharge port are disposed in the lower portion of the outer casing and accordingly, the structure around the lower portion of the outer casing becomes complicated, thereby making it very difficult to provide means for fastening the valve and deteriorating the workability in incorporating the valves into the intake system.

SUMMARY OF THE INVENTION

In view of the foregoing observations and description, the primary object of the present invention is to provide a fuel injection system which is provided with a bottom-feed type fuel injection valve and which facilitates incorporation of the valve into the intake system.

In accordance with the present invention, there is provided a fuel injection system for an engine comprising a plurality of bottom-feed type fuel injection valve assemblies each having an outer casing and an injector main body which is accommodated in the outer casing and is electrically operated, the outer casing being provided with a fuel inlet and a fuel outlet in communication with each other, a fuel supply pipe which is connected to the fuel inlet of the upstreammost fuel injection valve assembly, a fuel return pipe which is connected to the fuel outlet of the downstreammost fuel injection valve assembly, a plurality of connection pipes each connecting the fuel outlet of each fuel injection valve assembly to the fuel inlet of the next fuel injection valve assembly, and a harness member through which a wire harness for supplying power to the injector main body extends and which has a plurality of valve holders, each being formed integrally with the harness member and fixed to the upper portion of the outer casing by the fastener means.

With this arrangement, the harness member and the injection valve assemblies can both mechanically and electrically connected with each other by simply connecting the valve holders of the tubular harness member to the injection valve assemblies. Further, since the connection of the harness member and the injection valve assembly is at the upper portion of the injection valve assembly, the injection valve assemblies can be easily incorporated into the intake system irrespectively of the complication around the lower part of the injection valve assembly.

BRIEF DESCRIPTION OF THE DRAWINGS

FIG. 8 is an exploded perspective view for illustrating a sixth embodiment of the present invention, FIG. 9 is an exploded perspective view for illustrating a seventh embodiment of the present invention, and FIG. 10 is a cross-sectional view for illustrating an eighth embodiment of the present invention.

connection of the harness member 16 and the injection valve assembly is at the upper portion of the injection valve assembly, the injection valve assemblies can be easily incorporated into the intake system.

Figure 1:
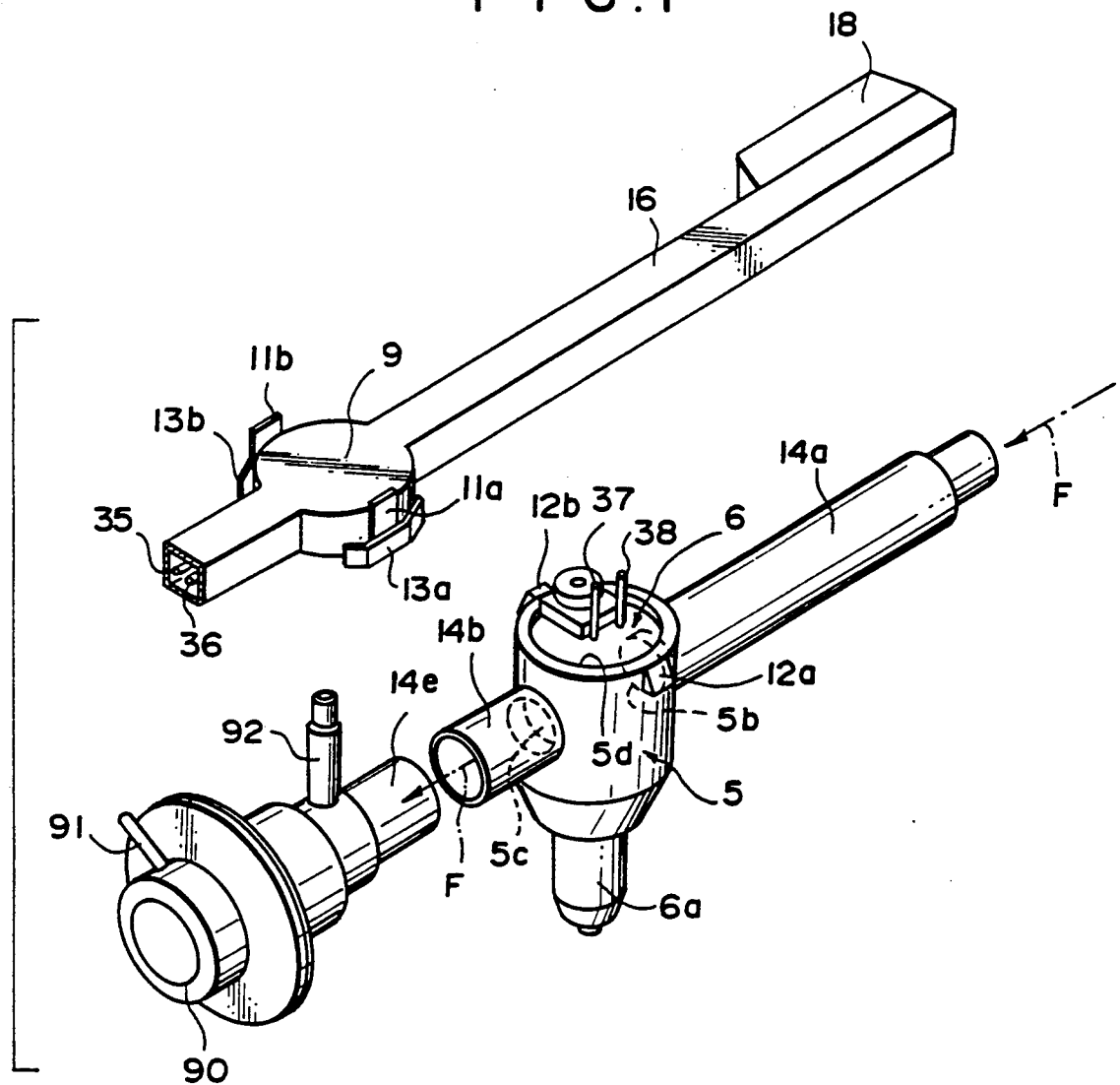
FIG. 1 is an exploded perspective view showing a fuel injection system in accordance with a first embodiment of the present invention.
Figure 2:
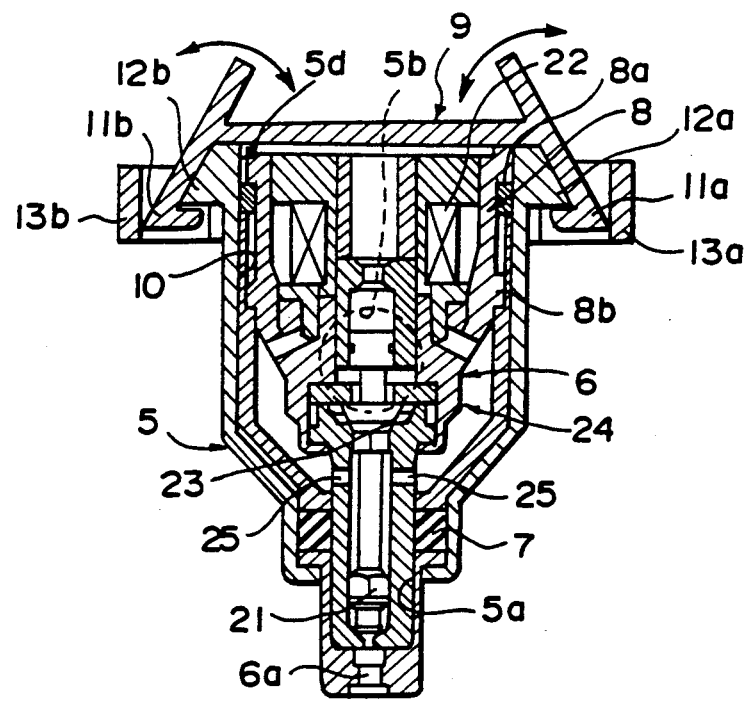
FIG. 2 is a cross-sectional view showing the injection valve assembly.
Figure 3:
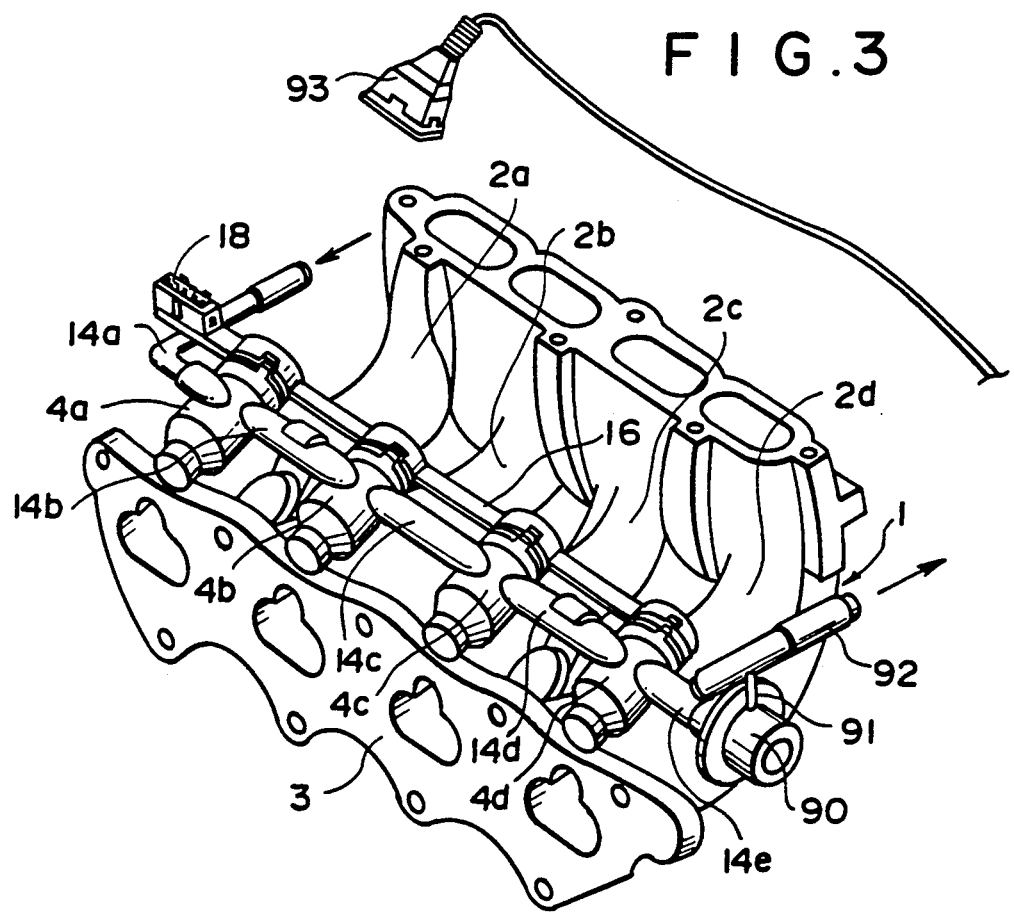
FIG. 3 is perspective view showing the fuel injection system together with the intake manifold of the engine.
Figure 4:
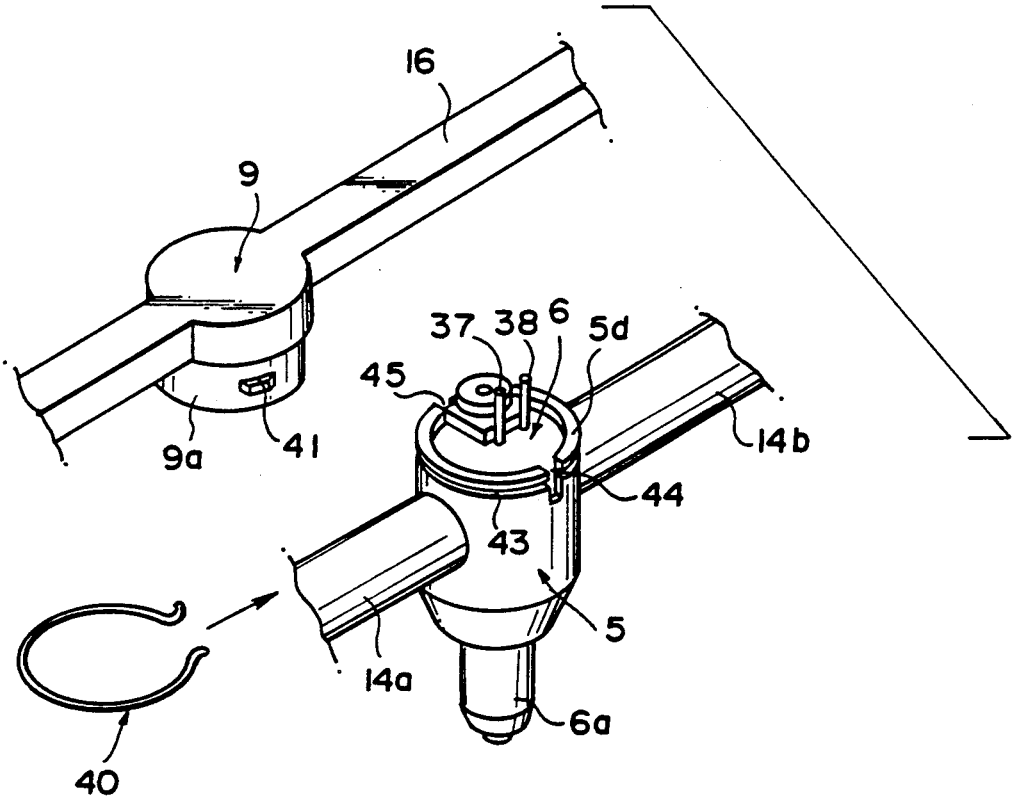
FIG. 4 is an exploded perspective view for illustrating a second embodiment of the present invention.

FIGS. 4–10 show additional embodiments of the present invention. The fuel injection system in accordance with the following embodiments mainly differs from the first embodiment in the means for connecting the valve holder 9 and the outer casing 5. FIG. 4 shows a second embodiment. In this embodiment, the valve holder 9 has a lower extension 9a which can be inserted into the opening 5d in the upper end face of the outer casing 5 and a pair of projections 41 are provided on the lower extension 9a. On the other hand, a pair of guide grooves 44 and 45 which extend in the axial direction are provided on the outer casing 5 and an annular engaging groove 43 is formed on the outer peripheral surface of the upper end portion of the outer casing 5. The lower extension 9a of the valve holder 9 is inserted into the opening 5d with the projections 41 thereon received in the guide grooves 44 and 45, and then a lock spring 40 formed with a resilient wire is fitted on the upper end portion of the outer casing 5 along the annular engaging groove 43. Thus, the lock spring 40 is engaged with the projections 41 and fixes the outer casing 5 to the valve holder 9.

Figure 5:
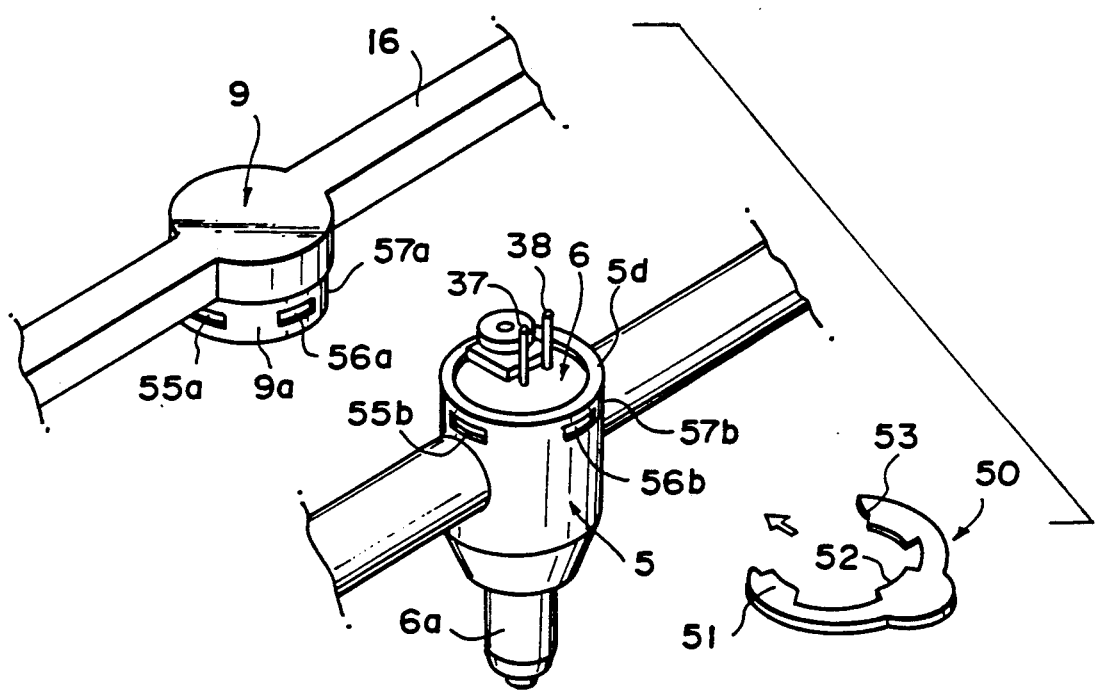
FIG. 5 is an exploded perspective view for illustrating a third embodiment of the present invention.

In a third embodiment shown in FIG. 5, the lower extension 9a of the valve holder 9 is provided with three slits 55a, 56a and 57a and the upper end portion of the outer casing 5 is provided with three slits 55b, 56b and 57b which are aligned with the slits 55a, 56a and 57a on the lower extension 9a when the lower extension 9a is inserted into the opening 5d in the upper end face of the outer casing 5. In this embodiment, the outer casing 5 is fixed to the valve holder 9 by inserting the lower extension 9a into the opening 5d and fitting a lock member 50 on the upper end portion of the outer casing 5 so that three inward projections 51, 52 and 53 formed on the lock member 50 are engaged with the three slit pairs 55a–55b, 56a–56b and 57a–57b. In this embodiment, the outer casing 5 is more firmly fixed to the valve holder than in the second embodiment since the outer casing 5 is engaged with the valve holder 9 at three points. The lock member 50 is formed of a leaf spring member.

Figure 6:
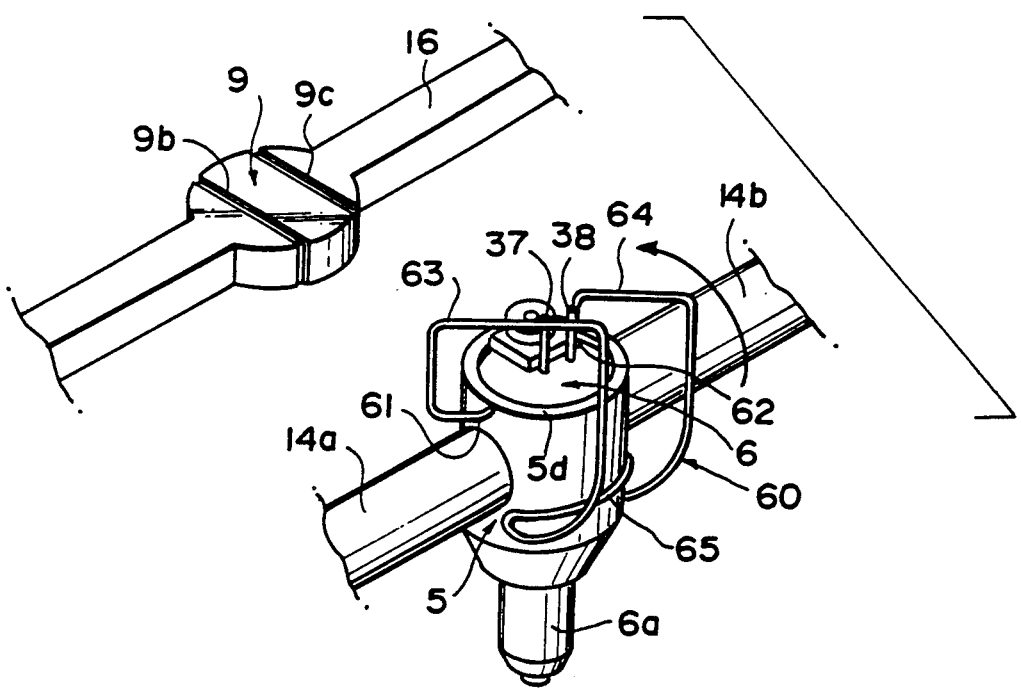
FIG. 6 is an exploded perspective view for illustrating a fourth embodiment of the present invention.

In a fourth embodiment of the present invention shown in FIG. 6, the valve holder 9 is rested on the upper end portion of the outer casing 5 and held thereon by a lock spring 60 which is rotatably supported on the upper end portion of the outer casing 5. The lock spring 60 is formed of a resilient wire and has opposite end portions 61 and 62 which are rotatably inserted into diametrically opposed holes formed on the side surface of the upper end portion of the outer casing 5, a parallel straight portions 63 and 64 which are seated in a pair of grooves 9b and 9c formed on the top surface of the valve holder 9, and a bight portion 65 which is fitted on the lower end portion of the outer casing 5. When the outer casing 5 is fixed to the valve holder 9, the lock spring 60 is first rotated upward as shown by the arrow and then the valve holder 9 is rested on the outer casing 5. When the lock spring 60 is rotated downward over the dead center until the bight portion 65 is snugly fitted on the lower end portion of the outer casing 5, the lock spring 60 presses the valve holder 9 against the outer casing 5 and they are fixed together. With this arrangement, the injection valve assembly can be easily mounted on the harness member 16 and can be easily demounted therefrom.

Figure 7:
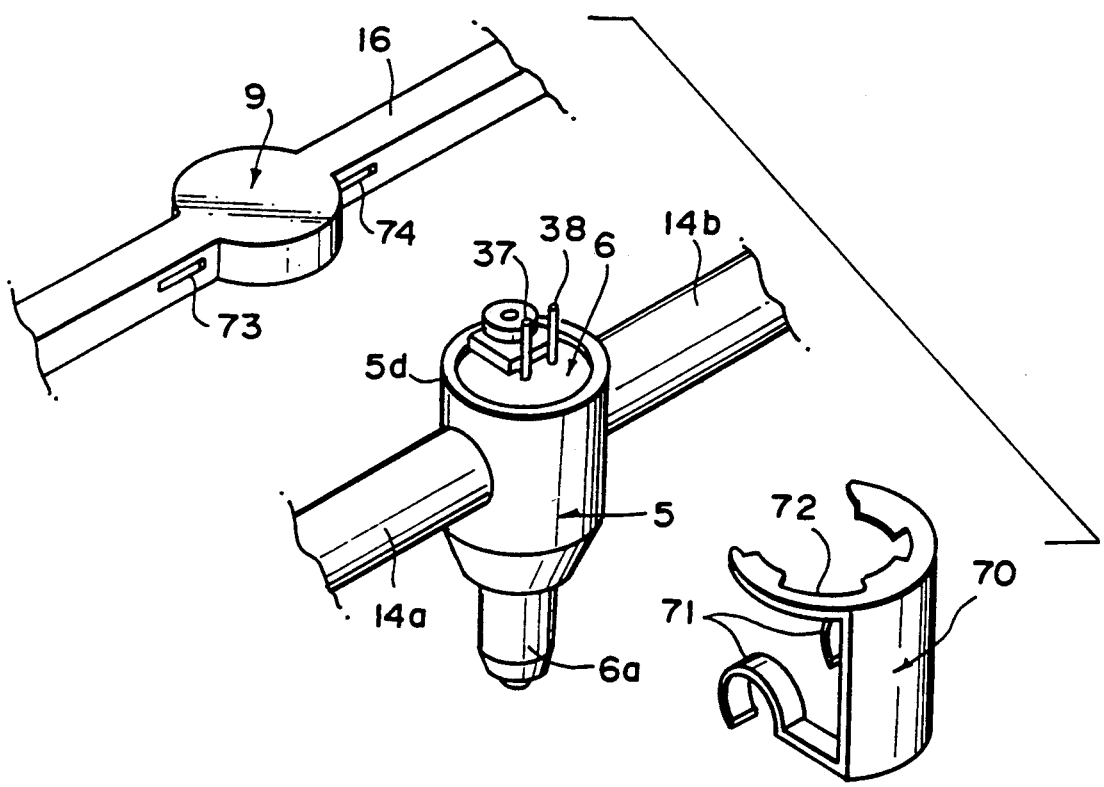
FIG. 7 is an exploded perspective view for illustrating a fifth embodiment of the present invention.

In a fifth embodiment of the present invention shown in FIG. 7, the valve holder 9 is rested on the upper end portion of the outer casing 5 and held thereon by a lock spring 70 formed by a leaf spring material. The lock spring 70 has a pair of semicircular gripping portions 71 which are fitted on the fuel pipes on opposite sides of the injection valve assembly and resiliently grip the fuel pipes so that the lock spring 70 can be rotated about the fuel pipes, and an arcuate engaging portions 72 provided with a pair of engaging pieces which are brought into engagement with a pair of engaging slits 73 and 74 formed in the harness member 16 on opposite sides of the valve holder 9.

In a sixth embodiment shown in FIG. 8, the outer casing 5 is provided with a pair of knock pins 81 and 82 and the harness member 16 is provided with a pair of guide holes 83 and 84. When the valve holder 9 is rested on the outer casing 5, the knock pins 81 and 82 are inserted into the guide holes 83 and 83, thereby guiding the valve holder 9.

In a seventh embodiment shown in FIG. 9, a skirt portion 85 guides the valve holder 9 when it is rested on the outer casing 5.

In the sixth and seventh embodiments, the pin plugs can be easily mated with the socket under the guidance of the guide means. This is advantageous since the pin plugs and the socket are behind the valve holder 9 while the injection valve assembly is incorporated into the intake system, and accordingly this further improves the workability in incorporating the fuel injection system into the intake system.

In an eighth embodiment shown in FIG. 10, the outer casing 5 is provided with a pair of protrusions 86 on opposite sides thereof. Each of the protrusions 86 has a threaded hole, and the harness member 16 has a pair of through holes on opposite sides of the valve holder 9. The injection valve assembly is fixed to the harness member 16 by a pair of bolts 87 which are screwed into the threaded holes in the protrusions 86 through the through holes in the harness member 16.

We claim:

1. A fuel injection system for an engine comprising:
   a plurality of bottom-feed type fuel injection valve assemblies each having an outer casing and an injector main body which is accommodated in the outer casing and is electrically operated, the outer casing being provided with a fuel inlet and a fuel outlet in communication with each other;
   a fuel supply pipe connected to the fuel inlet of the upstreammost fuel injection valve assembly;
   a fuel return pipe connected to the fuel outlet of the downstreammost fuel injection valve assembly;
   a plurality of connection pipes each connecting the fuel outlet of each injection valve assembly to the fuel inlet of the next fuel injection valve assembly, said connection pipes being disposed in a plane closer to an injection nozzle portion of the main body than an upper portion of the outer casing; and
   a harness member through which a wire harness for supplying power to the injector main body extends and which has a plurality of valve holders, each being formed integrally with the harness member and fixed to the upper portion of the outer casing by a fastener means;
   wherein said fastener means is connected in a region between said connection pipes and the upper portion of the outer casing so that said fastener means may be fastened or loosened without affecting the connection pipes.

2. A fuel injection system as defined in claim 1 in which a male connector is provided on one of the valve holder and the fuel injection valve assembly and a female connector is provided on the other, the male and female connectors being mated with each other and connecting the injector main body and the wire harness when each valve holder is fixed to the outer casing.

3. A fuel injection system as defined in claim 2 in which said fastener means comprises a plurality of clip members which are provided on the valve holder and a plurality of engaging projections which are provided on the outer casing, the clip members being adapted to be brought into engagement with the engaging projections and hold the outer casing on the valve holder.

4. A fuel injection system as defined in claim 2 in which said valve holder has a lower extension which is inserted into the upper end portion of the outer casing and provided with a plurality of projections and the outer casing is provided with a plurality of guide grooves in which the respective projections are received when the fuel injection valve assembly is set to the valve assembly, said fastener means comprising a lock spring which is fitted on the outer casing and holds the projections in the guide grooves.

5. A fuel injection system as defined in claim 2 in which said valve holder has a lower extension which is inserted into the upper end portion of the outer casing and provided with a plurality of slits and the outer casing is provided with a plurality of slits which are aligned with the slits on the lower extension of the valve holder when the fuel injection valve assembly is set to the valve assembly, said fastener means comprising a lock spring which has a plurality of inward projections and which is fitted on the outer casing so that the inner projections are engaged with the slits on the lower extension and the outer casing in alignment with each other.

6. A fuel injection system as defined in claim 2 in which said fastener means comprises a lock spring which is formed of a resilient wire and has opposite end portions which are rotatably inserted into diametrically opposed holes formed on the side surface of the upper end portion of the outer casing, a parallel straight portions which are seated in a pair of grooves formed on the top surface of the valve holder, and a bight portion which is fitted on the lower end portion of the outer casing.

7. A fuel injection system as defined in claim 2 in which an electrical connector for connecting the wire harness in the harness member to a power source is provided on the harness member at one end thereof.

8. A fuel injection system as defined in claim 7 in which said connector is provided on the end of the harness member corresponding to said fuel supply pipe, and a pressure regulator is provided at the end of the fuel passage formed by the connection pipes remote from the connector.

9. A fuel injection system as defined in claim 1 in which the fastener means is provided between an outer periphery of the upper portion of the outer casing and a lower portion of the harness member.

10. A fuel injection system as defined in claim 1 in which each of the connection pipes are arranged in a straight line so that a pipe on the fuel inlet and a pipe on the fuel outlet are disposed on opposite sides of the corresponding outer casing, and the harness member is also arranged in a straight line in the direction corresponding to the arrangement of said connection pipes.

* * * * *